United States Patent [19]

Oliver

[11] Patent Number: 4,733,140
[45] Date of Patent: Mar. 22, 1988

[54] SIDE PINCUSHION CORRECTION CIRCUIT WITH AUTOMATIC PICTURE TRACKING

[75] Inventor: Kirk Oliver, Forest Park, Ill.

[73] Assignee: Zenith Electronics Corporation, Glenview, Ill.

[21] Appl. No.: 695

[22] Filed: Jan. 6, 1987

[51] Int. Cl.$^4$ .............................................. H01J 29/56
[52] U.S. Cl. ................................................... 315/371
[58] Field of Search .................................. 315/371, 370

[56] References Cited

U.S. PATENT DOCUMENTS 4,216,392  8/1980  Valkestijn ........................... 307/268
4,496,882  1/1985  Oliver et al. ........................ 315/371

Primary Examiner—Theodore M. Blum

[57] ABSTRACT

A side pincushion correction circuit develops a vertical rate parabolic signal by multiplication of the vertical ramp by itself. A transistor current source is connected to a gain control terminal of a multiplier and is controlled by the operating voltage developed for the horizontal deflection system. A tilt potentiometer supplies a variable amplitude and polarity voltage to the multiplier. A potentiometer is coupled to the output of the multiplier. The tilted, variable amplitude parabolic signal is coupled to an error amplifier that is differentially supplied with a sinewave signal developed by integrating the parabolic signal. The error amplifier controls the voltage regulator that supplies operating voltage to the horizontal deflection system.

7 Claims, 1 Drawing Figure

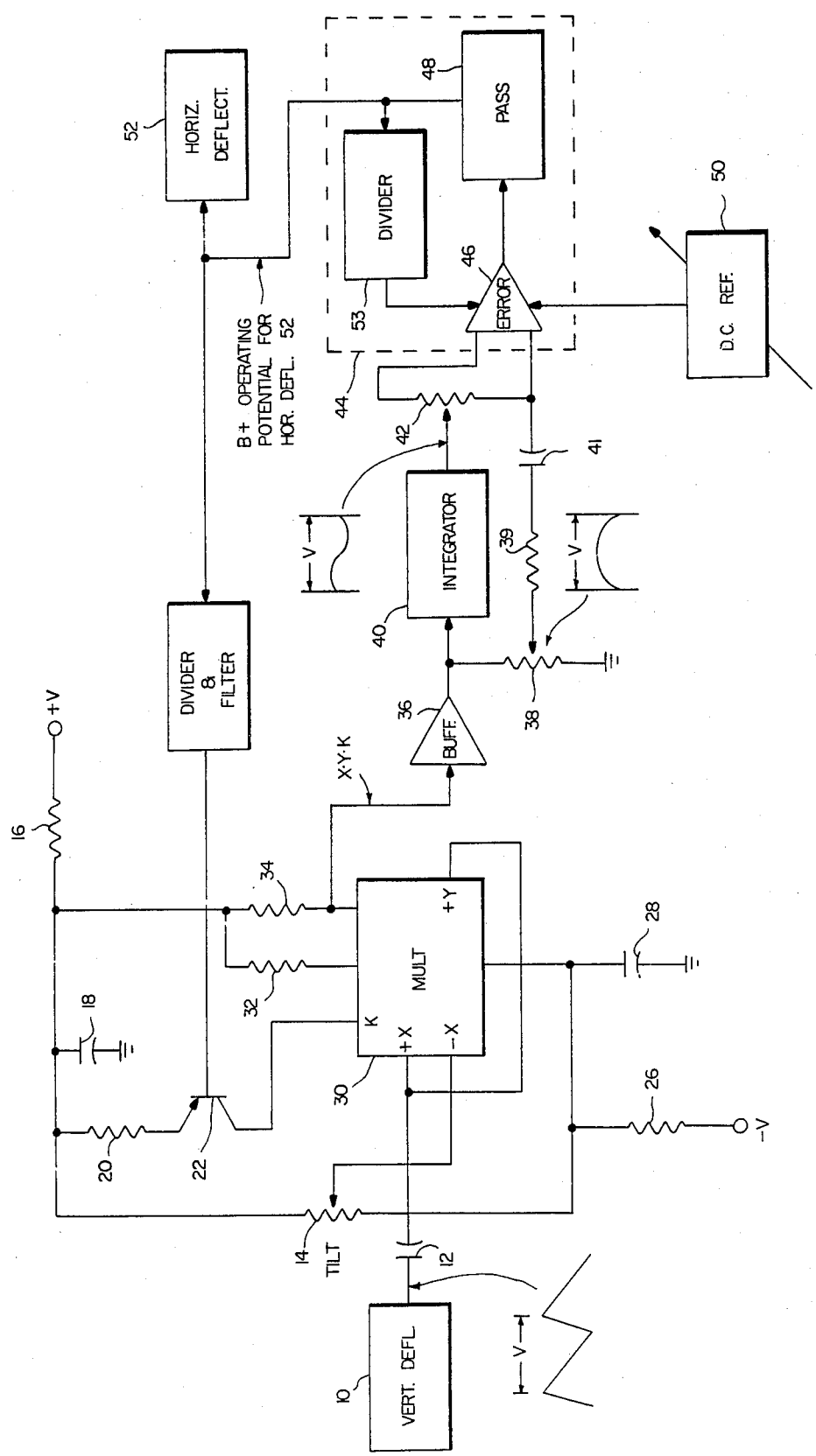

SIDE PINCUSHION CORRECTION CIRCUIT WITH AUTOMATIC PICTURE TRACKING

CROSS REFERENCE TO RELATED APPLICATIONS

This application is related to application Ser. No. 000,694, filed 1/6/87, entitled INDEPENDENT TOP/BOTTOM PINCUSHION CORRECTION CIRCUIT and application Ser. No. 067,574, filed 6/26/87, entitled AUTOMATIC TRACKING TOP/BOTTOM PINCUSHION CORRECTION CIRCUIT, both in the name of K. Oliver and assigned to Zenith Electronics Corporation.

BACKGROUND OF THE INVENTION AND PRIOR ART

This invention relates generally to side pincushion correction circuits for raster displays on cathode ray tubes (CRTs) and particularly to active side pincushion correction circuits.

As mentioned in application Ser. No. 000,694, pincushion correction for rasters produced on the faceplates of CRTs are well known in the art. Meeting the stringent requirements imposed on CRTs that are used as display devices for computers is the basis of the inventions in the copending applications. A further requirement of many computer monitors is to have the capability of producing display formats of different sizes. In such arrangements, it is highly desirable to have the pincushion correction circuitry automatically "track" changes in vertical and horizontal size so that readjustment is not required when switching to different raster formats. The active correction circuits of the present and the copending applications fill this need. The present invention is specifically directed to a side pincushion correction signal generator that automatically tracks changes in the raster vertical and horizontal dimensions.

OBJECTS OF THE INVENTION

A principal object of the invention is to provide an improved side pincushion correction circuit.

Another object of the invention is to provide a side pincushion correction circuit that automatically tracks for changes in raster size.

A further object of the invention is to provide a simple side pincushion correction generator of improved characteristics.

BRIEF DESCRIPTION OF THE DRAWING

These and other objects and advantages of the invention will be apparent upon reading the following description in conjunction with the drawing, the single FIGURE of which is a combined block and schematic diagram of the side pincushion generator of the invention.

DESCRIPTION OF THE PREFERRED EMBODIMENT

Referring to the drawing, a vertical deflection system 10 provides a vertical ramp signal through a capacitor 12 to the +X and +Y inputs of a multiplier 30. A tilt control potentiometer 14 is connected between a source of positive voltage +V and a source of negative voltage −V. Specifically, tilt potentiometer 14 is connected to +V and −V through resistors 16 and 26, respectively. Capacitors 18 and 28 return resistors 16 and 26, respectively, to ground. The slider arm on tilt potentiometer 14 is connected to the −X terminal of multiplier 30. A pair of resistors 32 and 34 connect multiplier 30 to the junction of resistor 16 and capacitor 18, with the multiplier output signal being developed across resistor 34. A transistor 22, connected as a current source, has its emitter electrode connected via a resistor 20 to the junction of resistor 16 and capacitor 18. The collector electrode of transistor 22 is connected to the K input of multiplier 30 and its base electrode is connected to the output of a divider and filter circuit 54. Multiplier 30 is a commercially available device designated as MC1495. Its output signal consists of a multiplication of the signals applied to the X, Y and K terminals. This output signal is supplied to a buffer amplifier 36. The output of buffer amplifier 36 is connected to a potentiometer 38, the slider of which is connected through a resistor 39 and a coupling capacitor 41 to one input of an error amplifier 46 within a pass regulator arrangement 44, indicated by the dashed lines. The output of buffer amplifier 36 is also supplied to an integrating network 40, the output of which is coupled to the slider of another potentiometer 42 that is connected across the two inputs of error amplifier 46. The output of the error amplifier is connected to a pass device 48 that is part of pass regulator 44. Pass regulator 44 supplies B+ operating voltage to the horizontal deflection system 52.

A DC reference source 50 is connected to the error amp 46. It is indicated as being variable for changing the operating voltage applied to the horizontal deflection system and thereby changing the horizontal size of the raster display produced on the CRT (not shown). The output of pass device 48 is also connected to the input of divider and filter 54 and through a divider 53 to the error amp 46.

In operation, the two vertical ramp waveforms applied to the +X and +Y inputs of multiplier 30 result in a vertical rate parabolic signal being developed at the multiplier output. Since the signal applied to the K input of the multiplier is a DC voltage, the overall amplitude of the output parabolic signal is linearly related thereto. The vertical rate parabolic signal may be tilted depending upon the position of the slider on tilt potentiometer 14. The potentiometer has its fixed resistance element connected between +V and −V and movement of the slider provides an offset of the multiplier which results in a ramp of variable amplitude and of either positive or negative polarity at the X·Y·K output at resistor 34. Consequently, the vertical rate parabolic signal may be tilted in either direction. The amplitude of the output parabolic signal is adjusted by potentiometer 38 and applied to the error signal amplifier in pass regulator 44. The integrator develops a generally sinewave shaped signal from the output parabolic signal and applies it to the slider of potentiometer 42 that is connected between the two inputs of the error amplifier. This arrangement permits variations in the amplitude and the phase of the added sinewave signal. Thus, the output of the error amplifier consists of a vertical rate parabolic signal of variable amplitude, tilt and phase, which signal is a conventional side pincushion correction signal. The pass regulator develops the B+ operating voltage for the horizontal deflection system, and its operation is modified by the error amplifier output. Thus, the horizontal deflection signal is modified at a vertical rate for compensating the inward bowing of the raster sides.

Derivation of the vertical rate parabolic correction signal by multiplying the vertical ramp by itself produces a highly beneficial result in that the correction signal automatically tracks for changes in vertical size. Since any change in vertical size will be accompanied by a corresponding linear change in vertical deflection voltage, the ramp voltages applied to the multiplier will increase linearly with increases in size. Therefore, the parabola produced will vary as the square of the ramp voltage, which is precisely the rate relationship that is desired for correcting the pincushion distortion in the increased height display.

A further benefit is obtained by adjusting the multiplier current source to reflect changes in operating voltage for the horizontal deflection system. The voltage is divided down and filtered to remove the pincushion correction signal modulation therefrom. The current source changes results in the potential applied to the "gain input" (K) of multiplier 30 and the output parabolic signal amplitude to vary directly with the steady state change in operating voltage supplied to the horizontal deflection system 52. If a horizontal raster size increase was required, for example, the pass regulator that supplies operating voltage to the horizontal deflection system would be set to enable the regulator to develop a larger output voltage which would be indicated by a change in DC reference 50. The larger output voltage is communicated to current source transistor 22 and results in a corresponding adjustment in the voltage applied to the K input terminal of multiplier 30 and produces a larger amplitude parabolic correction signal for application to pass regulator 44. Thus, the pincushion correction circuit of the invention automatically compensates for variations in raster size.

It is recognized that numerous modifications and changes in the described embodiment of the invention will be apparent to those skilled in the art without departing from its true spirit and scope. The invention is to be limited only as defined in the claims.

What is claimed is:

1. The method of compensating the sides of a raster, defined by a horizontal deflection system and a vertical deflection system; for pincushion distortion comprising the steps of:
    applying a vertical deflection related ramp signal to two inputs of a multiplier to develop a vertical rate parabolic signal therefrom;
    applying a variable DC voltage to another input of the multiplier to develop a tilt in said vertical rate parabolic signal;
    deriving a substantially sinewave signal from said vertical rate parabolic signal;
    combining said sinewave signal with said vertical rate parabolic signal for adjusting the phasing thereof; and
    modulating the horizontal deflection system with said phase adjusted vertical rate parabolic signal.

2. The method of claim 1 wherein said horizontal deflection system includes a regulator that controls its B+ operating potential, said phase adjusted vertical rate parabolic signal being applied to said regulator as an error signal for modifying the operation of said horizontal deflection system.

3. The method of providing a pincushion correction signal, that tracks changes in raster size, for compensating the sides of a raster defined by a horizontal deflection system and a vertical deflection system comprising the steps of:
    applying a vertical deflection related ramp signal to two inputs of a multiplier to develop a vertical rate parabolic signal therefrom;
    modulating a voltage regulator that controls the B+ operating voltage for said horizontal deflection system with an error signal comprising said vertical rate parabolic signal; and
    controlling the gain of said multiplier as a function of the operating voltage of said horizontal deflection system.

4. The method of claim 3, further including a current source coupled to a gain control input on said multiplier and wherein said controlling step comprises the further step of filtering the voltage output of said regulator and applying it to said current source to control the potential at said gain control input.

5. A side pincushion correction circuit comprising:
    vertical deflection means developing a vertical deflection signal;
    horizontal deflection means developing a horizontal deflection signal;
    multiplier means having a pair of inputs, each input being connected to receive a vertical ramp signal related to said vertical deflection signal, and developing an output signal;
    a tilt control coupled to one of said inputs of said multiplier means for adjustably controlling the tilt in said output signal;
    amplitude adjustment means coupled to receive said output signal for changing its output amplitude;
    integrating means coupled to receive said output signal for generating a substantially sinewave voltage therefrom;
    means for combining said sinewave voltage with said changed amplitude output signal; and
    means coupling the signal from said last-mentioned means to said horizontal deflection means.

6. The circuit of claim 5 further including means for controlling the gain of said multiplier means as a function of said horizontal deflection means.

7. The circuit of claim 6 wherein said gain controlling means includes; a gain controlled current source coupled to a gain control input of said multiplier means; and
    a feedback connection from said horizontal deflection means to said current source, whereby changes in the operating voltage applied to said horizontal deflection means are reflected in changes in the current from said current source to change the potential at said gain control input of said multiplier means.

* * * * *